(12) United States Patent
Bisheh Niasar et al.

(10) Patent No.: US 12,457,092 B2
(45) Date of Patent: Oct. 28, 2025

(54) ELLIPTIC CURVE CRYPTOGRAPHY MASKED BLINDING COUNTERMEASURE

(71) Applicant: Microsoft Technology Licensing, LLC, Redmond, WA (US)

(72) Inventors: Mojtaba Bisheh Niasar, Durham, NH (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 18/228,886

(22) Filed: Aug. 1, 2023

(65) Prior Publication Data
US 2025/0047461 A1    Feb. 6, 2025

(51) Int. Cl.
| | |
|---|---|
| H04L 9/00 | (2022.01) |
| H04L 9/06 | (2006.01) |
| H04L 9/08 | (2006.01) |
| H04L 9/30 | (2006.01) |
| H04L 9/32 | (2006.01) |

(52) U.S. Cl.
CPC ............ H04L 9/002 (2013.01); H04L 9/0662 (2013.01); H04L 9/0869 (2013.01); H04L 9/3066 (2013.01); H04L 9/3252 (2013.01); H04L 9/003 (2013.01); H04L 2209/04 (2013.01)

(58) Field of Classification Search
CPC ..... H04L 2209/04; H04L 9/002; H04L 9/003; H04L 9/06; H04L 9/065; H04L 9/0656; H04L 9/0662; H04L 9/08; H04L 9/0861; H04L 9/0869; H04L 9/30; H04L 9/3066; H04L 9/32; H04L 9/3247; H04L 9/3252
See application file for complete search history.

(56) References Cited

U.S. PATENT DOCUMENTS

| | | | | |
|---|---|---|---|---|
| 2002/0186848 A1* | 12/2002 | Shaik | ...................... | H04L 9/002 380/285 |
| 2021/0211306 A1* | 7/2021 | Barreto | ................. | H04L 9/3268 |
| 2023/0135566 A1* | 5/2023 | Luko | ...................... | H04L 9/003 713/168 |

OTHER PUBLICATIONS

Anastasova, et al., "Efficient and Side-Channel Resistant Design of High-Security Ed448 on ARM Cortex-M4", IEEE International Symposium on Hardware Oriented Security and Trust (HOST), Jun. 27, 2022, pp. 93-96.
International Search Report and Written Opinion received for PCT Application No. PCT/US2024/038273, Oct. 7, 2024, 13 pages.
Niasar, et al., "Optimized Architectures for Elliptic Curve Cryptography over Curve448", Cryptology ePrint Archive, Oct. 26, 2020, 19 pages.

* cited by examiner

*Primary Examiner* — D'Arcy Winston Straub
(74) *Attorney, Agent, or Firm* — Schwegman Lundberg & Woessner, P.A.

(57) ABSTRACT

Masked scalar blinding circuits for a side channel analysis (SCA) attack countermeasure are provided. A circuit can include logic gates configured to receive a private key and generate a first private key value and a second private key value that sum to the private key, a first multiplier configured to generate a first product based on a first random number and a multiplicative group order, a second multiplier configured to generate a second product based on a second random number and the multiplicative order group, and circuitry configured to generate a result and a carry out, based on the first private key value, second private key value, the first product, and the second product.

20 Claims, 5 Drawing Sheets

FIG. 1

PRIOR ART

ELLIPTIC CURVE CRYPTOGRAPHY MASKED BLINDING COUNTERMEASURE

BACKGROUND

Encryption or signing of digital information utilizes a secret key consisting of a number of bits. NISTp256 (National Institute of Science and Technology) utilizes 256 bit keys, NISTp384 utilizes 384 bit keys, and NISTp521 utilizes 521 bit keys, referred to as field sizes. Each bit of the key may be a one or a zero. The calculations performed to create a digital signature for a particular file of digital information performs many calculations that are different depending on whether a bit of the key is a one or a zero.

This difference in calculations can be used in what is called a side channel attack (SCA). Side channel attacks involve measuring observable information as the calculations are performed. Timing information may reveal that when each bit of the secret key is a zero, calculations take a different amount of time than when the bit is a one. A differential power analysis (DPA) may reveal that hardware implementing the calculations draws different amounts of power depending on whether the bit of the secret key is a zero or a one. Differential power analysis or electromagnetic information may also be used to help reveal the secret key.

Some countermeasures aim to reduce a correlation between a secret and a side-channel measurement. The countermeasures come at the cost of adding resource and latency overhead. One known method to help protect elliptic curve cryptography (ECC) against side-channel attacks is scalar blinding. There are some DPA attacks that do not attack the ECC scalar multiplication itself, but its countermeasures.

SUMMARY

Embodiments regard circuits, devices, and methods for protecting a countermeasure from an attack. The countermeasure helps protect from a side channel analysis attack. The circuits, devices, and methods protect the countermeasure from attack.

A method can include generating, (e.g., by logic gates) based on a private key, a first private key value and a second private key value that sum to the private key. Protecting the countermeasure can include generating, (e.g., by a first multiplier) based on a first random number and a multiplicative order group, a first product. Countermeasure protection can include generating, (e.g., by a second multiplier) based on a second random number and the multiplicative order group, a second product. The method can include generating, (e.g., by an adder) based on the first private key value, second private key value, the first product, and the second product, a result and a carry out.

The logic gates can include a first logical AND gate. The method can further include generating, by the first logical AND gate and based on the first private key value and a third random number the first private key value.

The logic gates can include a second logical AND gate and a negate gate. The method can further include generating, by the negate gate and based on the third random number an inverted random number. The method can further include generating, by the second logical AND gate and based on the private key and the inverted random number, the second private key value.

The method can further include generating, by a first adder and based on the first product and the first private key value, a first sum. The method can further include generating, by a second adder and based on the second product and the second private key value, a second sum. The method can further include generating, by a third adder and based on the first sum and the second sum, the result and the carry out.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Cryptographic implementations utilize a private key (sometimes called a "secret key") that is generated (e.g., randomly) to perform operations to produce a signature for some information, such as a message a user wishes to send. A receiver of the file and the signature can use a public key to verify the information is valid, which means that the information was signed by the user. The public key is generated based on the private key.

Cryptographic implementations may use an ECC for generating keys and signing files. ECC is a particularly efficient technique based on public key cryptography (PKC) and may be implemented on a field programmable gate array (FPGA). ECC implementations have been vulnerable to Side-Channel Analysis (SCA) attacks.

SCA uses some observable information from a device performing cryptographic operations, such as generating a secret key, generating the public key based on the secret key, and signing information using the secret key. The observations include measurements that may be gathered as the cryptographic operations iterate over the secret key bit values include timing information, simple power analysis (SPA), differential power analysis (DPA), or electromagnetic information. The measurements may be analyzed to reveal the secret key by correlating the observations to bit values of the secret key.

Countermeasures aim to reduce the correlation between the secret key and the side-channel measurement at the cost of adding resource/latency overhead. One such countermeasure is scalar blinding. The present inventive subject matter provides an improved implementation of scalar blinding. The improved implementation leverages additional random values, logical operations (e.g., AND, OR, negate, or the like), multiplications, or additions to make a more secure implementation of scalar blinding.

To implement an ECC architecture that is resistant to SCAs, different considerations can be accounted for. State-of-the-art implementations adopted some additional countermeasures to thwart DPA attacks, including point randomization and scalar blinding, which both modify both operands of the scalar multiplication used in ECC.

In ECC, scalar multiplication includes determining a value, Q, that is a secret key, k, multiplied by a point value, P, of a point chosen from an elliptic curve as Q=k·P.

Scalar blinding changes k in the scalar multiplication to try to obscure the secret key. A multiplicative group order, #E, can be added to k to avoid data dependency between a swap function in a Montgomery ladder and corresponding bit in k. Let r be a random value, a blinded scalar is computed as follows:

$$k_r = k + r \cdot \#E$$

Since adding a multiplicative group order times a base point (r in this case) results in a point in infinity, the correctness of the scalar blinding approach can be proven as follows:

$$k_r \cdot P = (k + r \cdot \#E) \cdot P = k \cdot P + r \cdot O = k \cdot P$$

However, a carry propagation during long-integer additions can exploit the secret key when the countermeasure of scalar multiplication is attacked, not the scalar multiplication itself. That is, the carry propagation of long-integer additions in performing scalar blinding can reveal the secret key.

Consider an example in which scalar blinding is performed on an l-bit radix. In ECC, encryption and decryption are performed on chunks of consecutive bits. The number of bits in each of the chunks (sometimes called a "sub-word") is called the radix. Use $k_i$ and $(r \cdot \#E)_i$ to denote the i-th sub-word of k and r·#E, respectively. Since $k_i$ is fixed and $(r \cdot \#E)_i$ is random in different executions, the carry out c=1 mainly depends on $k_i$ when adding $k_i$ to $(r \cdot \#E)_i$. The attacker can estimate the probability of c=1 by observing the outgoing carry bit of the adder. This way, the value of $k_i$ can be guessed with high confidence. For example, with a 4-bit radix, and $k_i=12$, the probability of c=1 is equal to % 75.

Figure 1:
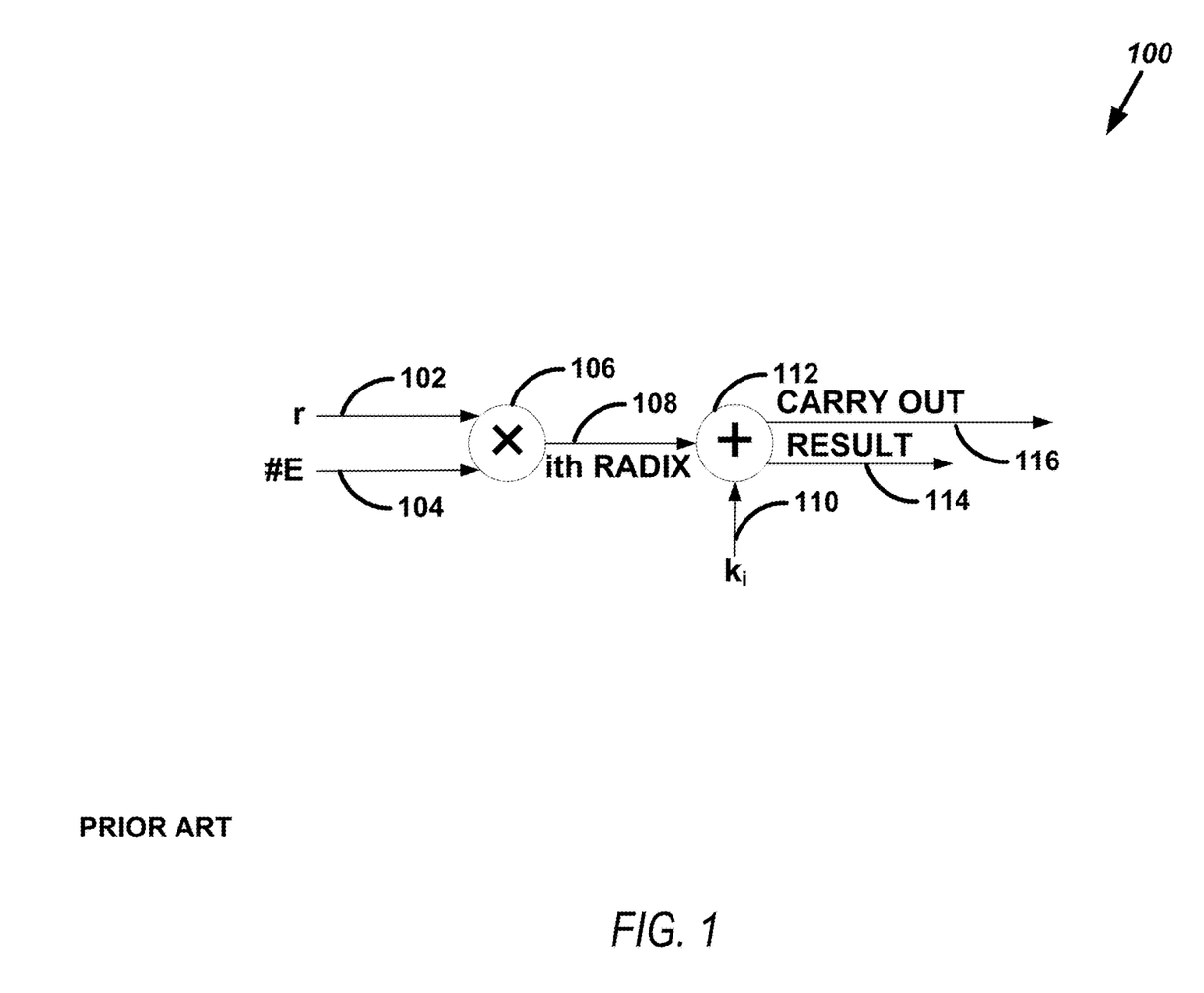
FIG. 1 illustrates, by way of example, a circuit diagram of a circuit that implements a scalar blinding countermeasure.

FIG. 1 illustrates, by way of example, a logical representation of a of a circuit 100 that implements a scalar blinding countermeasure. The circuit 100 as illustrated includes the random number, r 102, the multiplicative group order, #E 104, and the value of the radix for the secret key, $k_i$ 110, as input. A multiplier 106 (not modular multiplication) multiplies r 102 and #E 104 to generate a product 108. The product 108 is added to $k_i$ 110 by an adder 112 (not modular addition) to generate the sum which includes the result 114 and the carry out 116. By monitoring the carry 116 over time, an attacker can gain statistics regarding a percentage of times the carry out 116 was asserted ("1") and a percentage of time the carry out was unasserted ("0"). These statistics indicate the value of $k_i$ for each radix and thus indicate the value of the constituent parts of the secret key. The constituent parts of the secret key can be combined to determine the value of the secret key.

The circuit 100 is vulnerable to the attack described previously in which an attacker monitors a carry out 116 to decipher the secret key. The carry out 116 is a most significant bit (MSB) of result 114. The carry out 116 indicates whether a result from an immediately next radix has an additional "one" added to a least significant bit (LSB) thereto.

Figure 2:
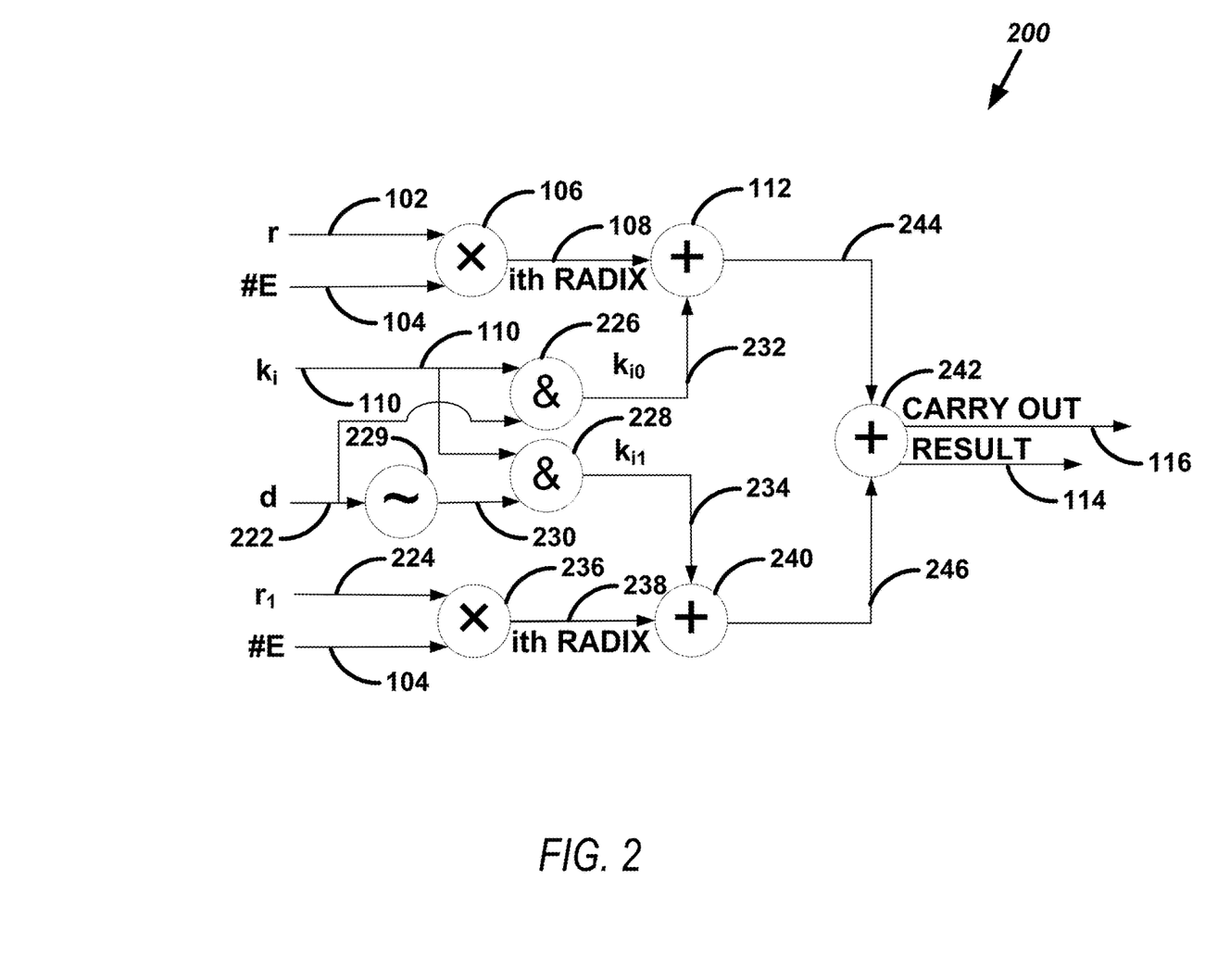
FIG. 2 illustrates, by way of example, a circuit diagram of an embodiment of a circuit that implements scalar blinding in a manner that prevents the SCA discussed.

The circuit 200 as illustrated includes the r 102, #E 104, $k_i$ 110, a random number, d 222, and another random number, $r_1$ 224, as input. The circuit 200 as illustrated includes multipliers 106, 236, adders 112, 240, 242, a negate gate 229, and logical "AND" gates 226, 228.

The negate gate 229 produces an inverted value 230 of the d 222. An inversion of a value includes each bit of the value flipped to the opposite value. The inverted value of "110010" is "001101". The AND gate 228 receives k; 110 and the inverted value 230. The AND gate 228 produces $k_{i1}$ 234 as the logical AND of k; 110 and the inverted value 230.

The multiplier 106 was discussed regarding FIG. 1. The multiplier 106 receives the r 102 and the #E 104 and generates the product 108. The product 108 is provided as an input to the adder 112.

The AND gate 226 receives the $k_i$ 110 and the d 222. The AND gate 226 produces $k_{i0}$ 232 as the logical AND of $k_i$ 110 and the d 222. d 222 and $k_i$ 110 can be the same number of bits. The adder 112 produces a sum 244 that is an addition of the $k_{i0}$ 232 and the product 108.

The negate gate 229 produces an inverted value 230 of the d 222. An inversion of a value includes each bit of the value flipped to the opposite value. The inverted value of "110010" is "001101". The AND gate 228 receives $k_i$ 110 and the inverted value 230. The AND gate 228 produces $k_{i1}$ 234 as the logical AND of $k_i$ 110 and the inverted value 230.

The multiplier 236 receives the #E 104, and the random number, r1 224, as input. The multiplier 236 produces a product 238 based on the input. The adder 240 produces a sum 246 that is an addition of the ki1 234 and the product 238. The adder 242 adds the sums 244, 246 to produce the result 114 and the carry out 116.

The circuit 200 provides a masked scalar blinding technique. The masked scalar blinding masks the vulnerability of the typical scalar blinding operations. The circuit 200 protects scalar blinding from the vulnerability as follows:

The $k_i$ 110 is split into two shares, i.e., $k_{i0}$ 232 and $k_{i1}$ 234, such that $k_i = k_{i0} + k_{i1}$. A random value, d 222, is determined and then $k_{i0}$ and $k_{i1}$ are determined as follows:

$$k_{i0} = k_i \, \& \, d$$

$$k_{i1} = k_i \, \& \, (\sim d)$$

Where & and ~ are bit-wise logical AND and bit-wise logical NEGATE operations, respectively. No arithmetic operations are performed to split scalar $k_i$, because the circuit 200 moves the leakage point to $k_{i0}$ 232 and $k_{i1}$ 234 and no arithmetic operations are required to move the leakage point.

Two random values are generated, such as by a random number generator of a cryptography circuit, one random number for r 102 and one random number for $r_1$ 224.

Masked scalar blinding as follows:

$$K + r \cdot \#E = (k_0 + k_1) + (r_0 + r_1) \cdot \#E$$
$$= (k_0 + r_0 \cdot \#E) + (k_1 + r_1 \cdot \#E)$$

Since the value of $k_{i0}$ and $k_{i1}$ are changing based on the value of d 222 in each iteration, the probability of c=1 in $k_{i0}+r \cdot \#E$ and $k_{i1}+r_1 \cdot \#E$ does not leak the secret value, k.

The cost of masking the scalar blinding countermeasure using the circuit 200 and compared to the circuit 100, is as follows:

The circuit 200 includes three (3) random values (i.e., d 222, r 102, and $r_1$ 224) instead of just the one random value that is used in the circuit 100. Circuit 200 perform two "logical and operation" and one "logical not operation". If the circuit 200 is implemented on a hardware platform, the cost such operations is negligible.

The circuit 200 performs two multiplications instead of the one multiplication performed by the circuit 100. This cost is also negligible as a single multiplier consumes limited hardware space and limited power. The circuit 200 performs three additions instead of the one addition performed by the circuit 100. Similar to the multiplications, the extra additions performed by the circuit 200 are also negligible.

The circuit 200, as discussed, performs masked scalar blinding. The circuit 200 offers more protection against side-channel information leakage. The circuit 200, when used with ECC circuitry, provides a secure architecture of ECC that can be optimized and mapped to different platforms to provide an SCA-protected ECC architecture.

Figure 3:
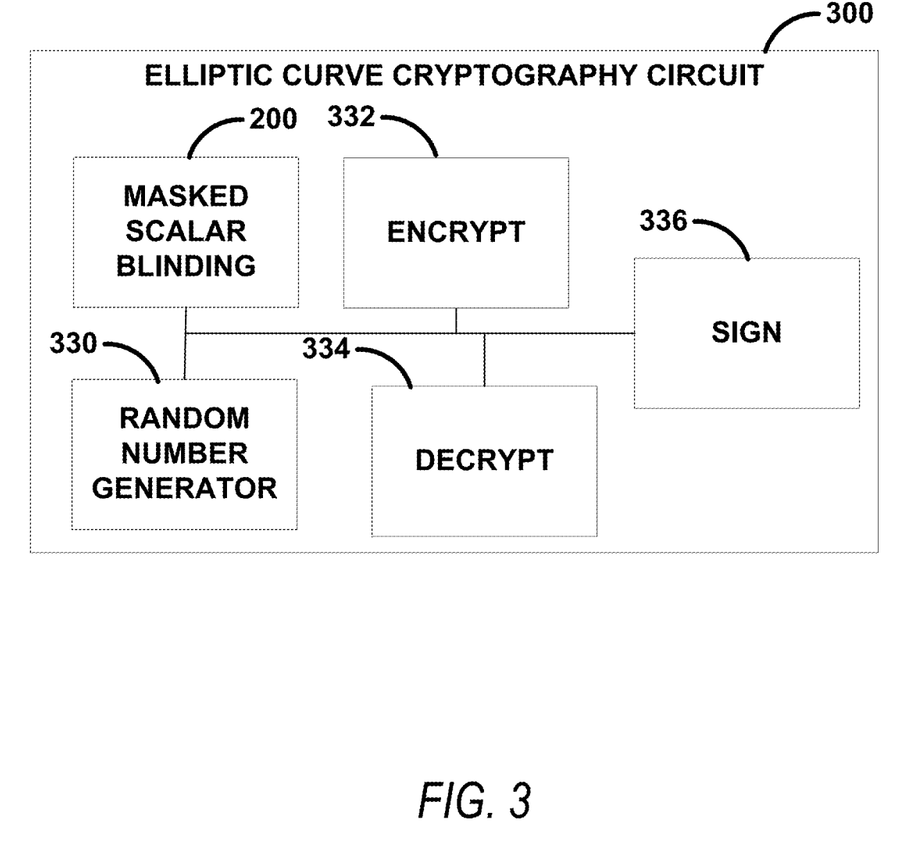
FIG. 3 illustrates, by way of example, a diagram of an embodiment of an ECC circuit.

FIG. 3 illustrates, by way of example, a diagram of an embodiment of an ECC circuit 300. The ECC circuit 300 can implement an elliptic curve digital signature algorithm (ECDSA) technique. The ECC circuit 300 includes the circuit 200 that performs masked scalar blinding, a random number generator 330, and circuitry configured to perform encryption 332, decryption 334, and signing 336. The random number generator 330 can be dedicated to, and only accessible by components of the ECC circuit 300. The random number generator 330 generates d 222, r 102, and $r_1$ 224. The encryption 332 generates ECC ciphertext based on plaintext. The decryption 334 determines plaintext based on ECC encrypted ciphertext. The signing 336 generates a value that a receiver can use, along with a public key, to verify that a message associated with the value is verified and authentic. The ECC circuit 300 can be implemented using a programmable gate array, an application specific integrated circuit, other circuitry, software, firmware, a combination thereof, or the like.

Figure 4:
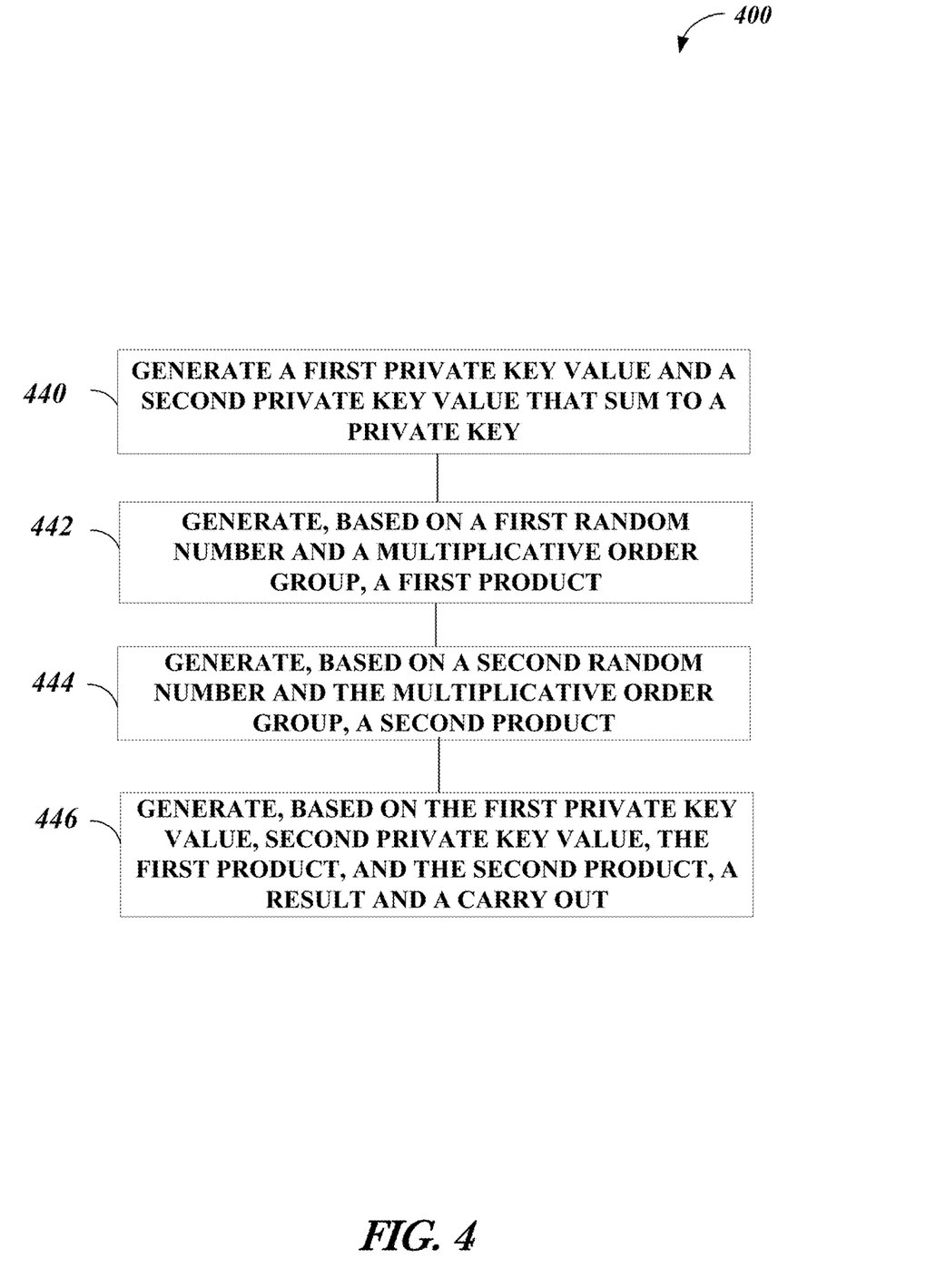
FIG. 4 illustrates, by way of example, a diagram of an embodiment of a method for masked scalar blinding.

FIG. 4 illustrates, by way of example, a diagram of an embodiment of a method 400 for masked scalar blinding. The method 400 as illustrated includes generating, (e.g., by logic gates) and based on a private key, a first private key value and a second private key value such that the first private key value and the second private key value sum to the private key, at operation 440; generate, (e.g., by a first multiplier) based on a first random number and a multiplicative order group, a first product, at operation 442; generating, (e.g., by a second multiplier) based on a second random number and the multiplicative order group, a second product, at operation 444; and generating, (e.g., by circuitry) based on the first private key value, second private key value, the first product, and the second product, a result and a carry out, at operation 446.

The logic gates can include a first logical AND gate. The method 400 can further include generating, by the first logical AND gate and based on the first private key value and a third random number the first private key value.

The logic gates can include a second logical AND gate and a negate gate. The method 400 can further include generating, by the negate gate and based on the third random number an inverted random number. The method 400 can further include generating, by the second logical AND gate and based on the private key and the inverted random number, the second private key value.

Figure 5:
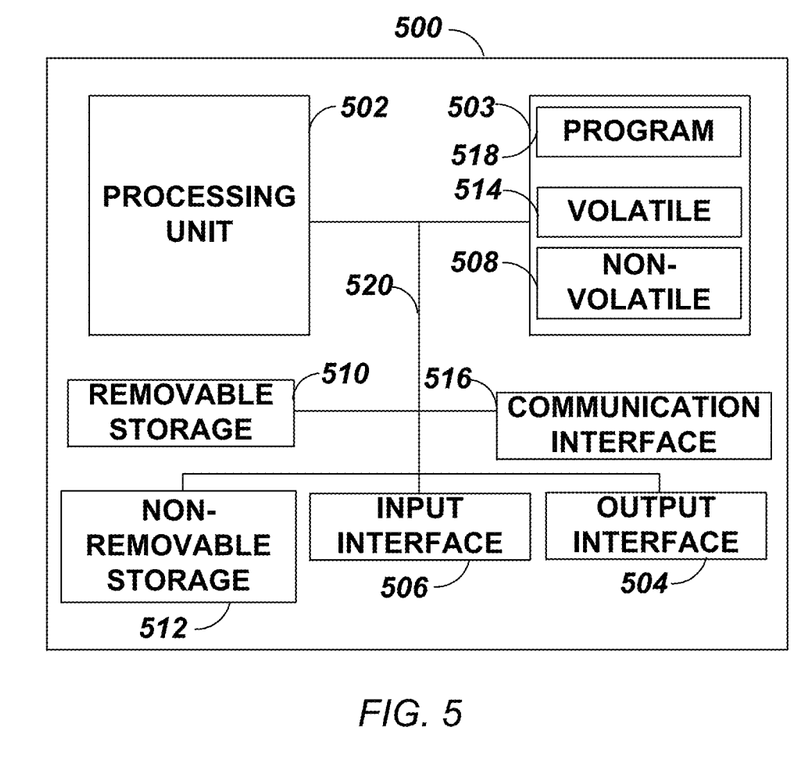
FIG. 5 is a block schematic diagram of a computer system to perform cryptographic calculations in a secure manner and protect against SCA attacks, and for performing methods and algorithms according to example embodiments.

FIG. 5 is a block schematic diagram of a computer system 500 to perform cryptographic calculations in a secure manner and protect against SCA attacks, and for performing methods and algorithms according to example embodiments. Any of the multipliers 106, 236, adders 112, 240, 242, negate 229, AND gates 226, 228, encrypt 332, decrypt 334, signing 336, random number generator 330, or other component can be implemented using the system 500 or a component thereof. All components need not be used in various embodiments, such as in FPGA implementation.

FIG. 5 is a block schematic diagram of a computer system 500 to perform cryptographic calculations in a secure manner and protect against SCA attacks, and for performing methods and algorithms according to example embodiments. Any of the multipliers 106, 236, adders 112, 240, 242, negate 229, AND gates 226, 228, encrypt 332, decrypt 334, signing 336, random number generator 330, or other component can be implemented using the system 500 or a component thereof. All components need not be used in various embodiments, such as in FPGA implementation.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES

Example 1 includes a masked scalar blinding circuit comprising logic gates configured to receive a private key and generate a first private key value and a second private key value that sum to the private key, a first multiplier configured to generate a first product based on a first random number and a multiplicative group order, a second multiplier configured to generate a second product based on a second random number and the multiplicative order group, and circuitry configured to generate a result and a carry out, based on the first private key value, second private key value, the first product, and the second product.

In Example 2, Example 1 further includes, wherein the logic gates include logical AND gates and a negate gate.

In Example 3, Example 2 further includes, wherein the logical AND gates include a first logical AND gate, and the first logical AND gate is configured to receive the private key and a third random number as input and generate the first private key value.

In Example 4, Example 3 further includes, wherein the logical AND gates include a second logical AND gate, the negate gate is configured to receive the third random number as input and generate an inverted random number, and the second logical AND gate is configured to receive the private key and the inverted random number as input and generate the second private key value.

In Example 5, at least one of Examples 1-4 further includes, wherein the circuitry includes a first adder configured to receive the first product and the first private key value and generate a first sum as output.

In Example 6, Example 5 further includes, wherein the circuitry further includes a second adder configured to receive the second product and the second private key value and generate a second sum as output.

In Example 7, Example 6 further includes, wherein the circuitry further includes a third adder configured to generate the result and the carry out based on the first sum and the second sum.

In Example 8, at least one of Examples 1-7 further includes, wherein the circuit comprises a programmable gate array.

In Example 9, Example 8 further includes, wherein the programmable gate array is configured to perform elliptic curve digital signature algorithm (ECDSA).

In Example 10, Example 9 further includes a random number generator configured to generate the first and second random numbers.

Example 11 includes a masked scalar blinding method comprising generating, by logic gates and based on a private key, a first private key value and a second private key value such that the first private key value and the second private key value sum to the private key, generating, by a first multiplier and based on a first random number and a multiplicative order group, a first product, generating, by a second multiplier and based on a second random number and the multiplicative order group, a second product, and generating, by circuitry and based on the first private key value, second private key value, the first product, and the second product, a result and a carry out.

In Example 12, Example 11 further includes, wherein the logic gates include a first logical AND gate and the method further comprises generating, by the first logical AND gate and based on the first private key value and a third random number the first private key value.

In Example 13, Example 12 further includes, wherein the logic gates include a second logical AND gate and a negate gate and the method further comprises generating, by the negate gate and based on the third random number an inverted random number, and generating, by the second logical AND gate and based on the private key and the inverted random number, the second private key value.

In Example 14, at least one of Examples 11-13 further includes generating, by a first adder and based on the first product and the first private key value, a first sum.

In Example 15, Example 14 further includes generating, by a second adder and based on the second product and the second private key value, a second sum.

In Example 16, Example 15 further includes generating, by a third adder and based on the first sum and the second sum, the result and the carry out.

Example 17 includes a device comprising a processor, and a memory device coupled to the processor and having a program stored thereon for execution by the processor to perform operations comprising generating, by a random number generator, first, second, and third random numbers, generating, by first and second logical AND gates and a negate gate and based on a private key and the third random number, a first private key value and a second private key value such that the first private key value and the second private key value sum to the private key, generating, by a first multiplier and based on the first random number and a multiplicative order group, a first product, generating, by a second multiplier and based on the second random number and the multiplicative order group, a second product, and generating, by circuitry and based on the first private key value, second private key value, the first product, and the second product, a result and a carry out.

In Example 18, Example 17 further includes, wherein the operations further comprise generating, by a first adder and based on the first product and the first private key value, a first sum.

In Example 19, Example 18 further includes, wherein the operations further comprise generating, by a second adder and based on the second product and the second private key value, a second sum.

In Example 20, Example 19 further includes, wherein the operations further comprise generating, by a third adder and based on the first sum and the second sum, the result and the carry out.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A masked scalar blinding circuit comprising:
   logic gates configured to receive a private key and generate a first private key value and a second private key value that sum to the private key;
   a first multiplier configured to generate a first product based on a first random number and a multiplicative order group;
   a second multiplier configured to generate a second product based on a second random number and the multiplicative order group; and
   circuitry configured to generate a result and a carry out, based on the first private key value, second private key value, the first product, and the second product, the result and the carry out represent a value determined based on a masked version of the private key.

2. The circuit of claim 1, wherein the logic gates include logical AND gates and a negate gate.

3. The circuit of claim 2, wherein:
   the logical AND gates include a first logical AND gate; and
   the first logical AND gate is configured to receive the private key and a third random number as input and generate the first private key value.

4. The circuit of claim 3, wherein:
   the logical AND gates include a second logical AND gate;
   the negate gate is configured to receive the third random number as input and generate an inverted random number; and
   the second logical AND gate is configured to receive the private key and the inverted random number as input and generate the second private key value.

5. The circuit of claim 1, wherein the circuitry includes a first adder configured to receive the first product and the first private key value and generate a first sum as output.

6. The circuit of claim 5, wherein the circuitry further includes a second adder configured to receive the second product and the second private key value and generate a second sum as output.

7. The circuit of claim 6, wherein the circuitry further includes a third adder configured to generate the result and the carry out based on the first sum and the second sum.

8. The circuit of claim 1, wherein the circuit comprises a programmable gate array.

9. The circuit of claim 8, wherein the programmable gate array is configured to perform elliptic curve digital signature algorithm (ECDSA).

10. The circuit of claim 1, further comprising a random number generator configured to generate the first and second random numbers.

11. A masked scalar blinding method comprising:
    generating, by logic gates and based on a private key, a first private key value and a second private key value that sum to the private key;

generating, by a first multiplier and based on a first random number and a multiplicative order group, a first product;

generating, by a second multiplier and based on a second random number and the multiplicative order group, a second product; and generating, by circuitry and based on the first private key value, second private key value, the first product, and the second product, a result and a carry out, the result and the carry out represent a value determined based on a masked version of the private key.

12. The method of claim 11, wherein the logic gates include a first logical AND gate and the method further comprises generating, by the first logical AND gate and based on the first private key value and a third random number the first private key value.

13. The method of claim 12, wherein the logic gates include a second logical AND gate and a negate gate and the method further comprises:

generating, by the negate gate and based on the third random number an inverted random number; and generating, by the second logical AND gate and based on the private key and the inverted random number, the second private key value.

14. The method of claim 11, further comprising generating, by a first adder and based on the first product and the first private key value, a first sum.

15. The method of claim 14, further comprising generating, by a second adder and based on the second product and the second private key value, a second sum.

16. The method of claim 15, further comprising generating, by a third adder and based on the first sum and the second sum, the result and the carry out.

17. A device comprising:

a processor, and a memory device coupled to the processor and having a program stored thereon for execution by the processor to perform operations comprising:

generating, by a random number generator, first, second, and third random numbers;

generating, by first and second logical AND gates and a negate gate and based on a private key and the third random number, a first private key value and a second private key value that sum to the private key;

generating, by a first multiplier and based on the first random number and a multiplicative order group, a first product;

generating, by a second multiplier and based on the second random number and the multiplicative order group, a second product; and generating, by circuitry and based on the first private key value, second private key value, the first product, and the second product, a result and a carry out, the result and the carry out represent a value determined based on a masked version of the private key.

18. The device of claim 17, wherein the operations further comprise generating, by a first adder and based on the first product and the first private key value, a first sum.

19. The device of claim 18, wherein the operations further comprise generating, by a second adder and based on the second product and the second private key value, a second sum.

20. The device of claim 19, wherein the operations further comprise generating, by a third adder and based on the first sum and the second sum, the result and the carry out.

* * * * *